Figure 1:
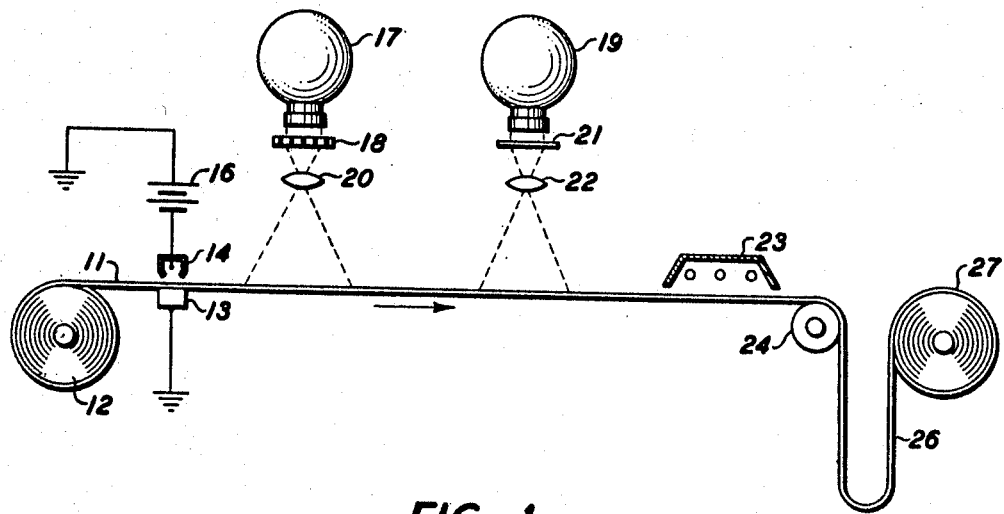

April 1, 1969   J. C. URBACH   3,436,216
IMAGE STORAGE COMPRISING A THERMOPLASTIC DEFORMATION PATTERN
Filed Aug. 2, 1965

INVENTOR.
JOHN C. URBACH
BY Ronald Zibelli
James J. Ralabate
ATTORNEYS

United States Patent Office 3,436,216
Patented Apr. 1, 1969

3,436,216
IMAGE STORAGE COMPRISING A THERMO-
PLASTIC DEFORMATION PATTERN
John C. Urbach, Penfield, N.Y., assignor to Xerox Corporation, Rochester, N.Y., a corporation of New York
Filed Aug. 2, 1965, Ser. No. 476,533
Int. Cl. G03g 13/22
U.S. Cl. 96—1.1                    9 Claims This invention relates in general to imaging and more specifically to thermoplastic deformation imaging.

Great interest has recently arisen in techniques for recording images on thermoplastic layers by the combined application of an electrostatic field and a softening influence upon the thermoplastic. For example, two very recent techniques known as "relief" imaging and "frost" imaging have recently been devised and are more fully described in the current literature. See for example an article, "A Cyclic Xerographic Method Based on Frost Deformation," by R. W. Gundlach and C. J. Claus, appearing in the January-February 1963 issue of the Journal of Photographic Science and Engineering, and U.S. Patent 3,113,179. The rudiments of these techniques involve applying a latent electrostatic image or a charge pattern to an insulating thermoplastic film which is softenable as by the application of either heat or solvent vapor and softening the film until the electric field force of the charge pattern deforms the film. In frost imaging, when this critical or threshold condition is met, a series of vary small surface folds or wrinkles are formed on the film with the depths of these folds in any particular surface area of the film being dependent upon the amount of charge in that area, thus giving the image produced a frosted appearance. This technique has really good continuous tone response, reproducing large solid dark areas and small degradation differences in tone accurately. Relief imaging, on the other hand, although based on similar process steps, produces ridge-like deformations in the thermoplastic at areas of high potential gradient in the applied charge pattern. Since the relief technique produces deformation for the most part only at the edges of the charged area, it is most suitable for the reproduction of high contrast subjects such as line copy or the like. Once a thermoplastic deformation image of either type is formed on the surface of the thermoplastic the image is, according to currently practiced techniques, fixed by allowing or causing the film to reharden. This rehardening may be accomplished by removing the heat or solvent vapors which are initially employed to soften the thermoplastic or in the case of a material which is sufficiently soft at room temperature to deform under the influence of a deposited charge pattern by cooling this material below its freezing point. It has also been found possible to erase such images after they have been viewed by simply resoftening the film and maintaining a low viscosity for a sufficient period of time. Discharge is believed to occur by fluid migration of the ions making up the charge pattern from the top surface of the deformed film while it is still soft during initial deformation and surface tension forces restore a smooth surface to the film on resoftening so that it is ready for reuse in the system.

The ability to see images of this type is of course based on the fact that the deformed surfaces serve as light scattering centers changing the angles of reflection or transmission of incident light. Accordingly the characteristics of thermoplastic deformation images are dependent upon the viewing or projection system employed. When relief images are viewed directly, it is frequently difficult to see them clearly unless they are viewed from the proper angle; and in the case of projection, specialized projectors such as Schlieren projectors must often be employed if the images are to be seen clearly.

In addition, in frost imaging as it is presently practiced, as well as in many other imaging systems such as silver halide emulsion imaging, the information stored may be thought of as a signal stored on a random carrier such as the blackened grains of the silver halide film or the random deformation of the frost image. Because of the random nature of these carriers, they are essentially inseparable from the signal or information being stored; or to put it in another way, demodulation of the stored information is essentially impossible and the noisy random carrier is always present in and degrades the final image.

As stated above, relief images tend to be faint and difficult to see, requiring special projectors, because they only cause layer deformation at points of high field gradient which occur at the edges of image areas. In addition, since relief forms in lines at high field gradients, these lines tend to appear in the projected image.

It is accordingly an object of this invention to provide a novel imaging system.

It is a further object of this invention to provide an imaging system based on electrostatically induced thermoplastic deformation.

It is a further object of this invention to provide a method of storing an image signal on a periodic carrier.

Yet another object of the invention is to provide a method of forming and storing an image by using the image signal to modulate a carrier at or closely adjacent the hydrodynamic resonant frequency of the deformable material.

A still further object of the invention is to provide an imaging system with a large improvement in gross sensitivity and an extremely high signal to noise ratio.

Yet another object of the invention is to provide a novel image storage and readout apparatus.

These and still further objects of this invention are accomplished generally speaking by using the image signal to amplitude modulate a deformation pattern. This pattern is preferably formed at the hydrodynamic resonant frequency of the deformable thermoplastic material, although other frequencies may be employed. Generally speaking, this preferred carrier wavelength is approximatey twice the thickness of the thermoplastic material coating, generally ranging from about 1.5 to about 2.7 times this thickness for films thicker than about 2 microns and from about 1.5 to about 10 times this thickness for thinner films. This hydrodynamic "resonant" frequency is that at which deformation takes place most readily and with the greatest depth or "intensity" for a given level of charge being applied to the deformable material. In other words, the deformation image shows a very marked peak of response when this "resonant" deformation frequency is employed. The electrostatic charge pattern is laid down on the deformable film at the desired frequency and amplitude modulated in accordance with the image intensity, by any suitable technique. Thus, for example, electron beam recording may be employed by applying the input signal to be recorded to the control grid of the electron beam to vary its intensity while the horizontal and vertical scanning generators which control the deflection grids of the electron beam source are adjusted so that the scanning frequency is equal to the resonant frequency of the deformable film. In another technique, the thermoplastic film is blended with a photoconductor, uniformly charged and exposed to an actinic light source through a screen having opaque portions spaced at the resonant frequency. This then forms a pattern of electrostatic charge remaining on the film with a spacing between adjacent charged areas equal to the resonant frequency spacing. Image exposure through the screen serves to modulate this pattern of charge according to the intensity of light reached it through the image. The film is then softened so that deformation takes place at resonant frequency spacings with the depth of deformation in any one portion of the image depending upon the intensity of light to which it was exposed through the original. Demodulation of the signal from the carrier is then accomplished by illuminating the deformation image with coherent light and removing the carrier by any suitable spatial filtering technique. This can readily be accomplished so long as the carrier employed in the initial formation of the image is periodic. By illuminating with a coherent source to form a Fraunhoffer diffraction pattern of the original thermoplastic deformation image, the spatial frequency spectrum of the periodic carrier will be concentrated in the vicinity of discrete points in the diffraction pattern. By obscuring these small points in the optical path, demodulation is achieved and the remaining light is used to form the image on a screen, photosensitive surface or other image receiving surface.

Figure 2:
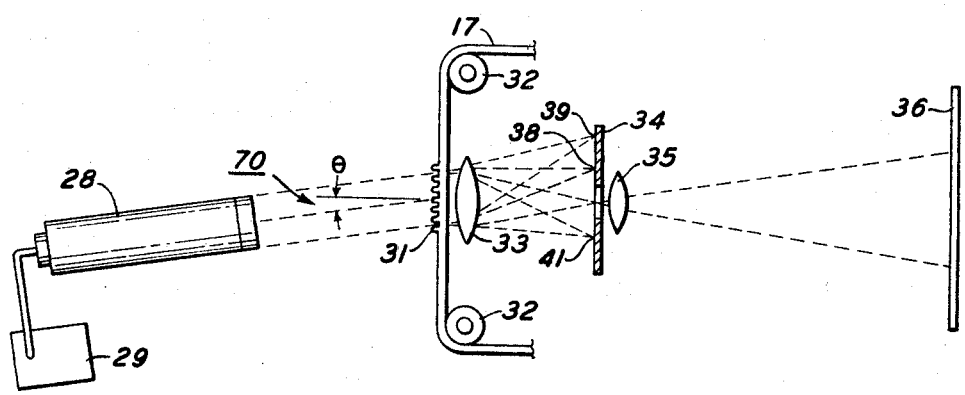

In order that the invention will be more clearly understood, reference is now made to the accompanying drawings illustrating an exemplary embodiment of the invention in which:

FIG. 1 is a side sectional view of an exemplary apparatus for forming a thermoplastic deformation image adapted for use in the instant invention; and FIGURE 2 is an upper plan view of a device for projecting and demodulating the image from its carrier according to the invention.

Referring now to FIGURE 1 of the drawings, there is seen a web of imaging material 11 being drawn off a supply roll 12.

In this particular embodiment of the invention the deformable thermoplastic insulating web 11 is also photoconductive so that light exposure may be used to control a charge pattern deposited thereon; whereas in other embodiments of the invention in which charge pattern deposition on the insulating thermoplastic is accomplished by electron beam recording, electrical discharge recording or charge transfer, a single component insulating thermoplastic may be emloyed. In fact such a single component layer may even be employed with the instant embodiment where the deformable layer is laminated or held in contact with a photoconductive layer which is used to control the amount of charge deposited on the web. The imaging layer itself need not necessarily be in the form of a web but may be in the form of a rigid plate, flexible endless belt or in any other suitable mechanical configuration. It will also be generally desirable to coat the deformable insulating thermoplastic layer of the web on a substrate which is more heat stable than the deformable layer itself to prevent gross distortion of the web during the imaging process when the imaging material is softened. This substrate is also preferably electrically conductive so as to facilitate charging and image-wise discharge upon exposure in the instant process. Suitable substrates include flexible metal foils such as aluminum, brass, copper, etc., as well as some of the more heat resistant polymers such as polyethylene terephthalate, polycarbonates and polyurethanes, especially when these are coated with thin, transparent conductive layers of tin oxide, copper iodide or the like. As stated above, any suitable deformable insulating thermoplastic layer may be used in carrying out the invention. Typical insulating thermoplastics include Staybelite Ester 10 and Pentalyn H, pentaerythritol and glycerol esters, respectively, of partially hydrogenated rosin sold by the Hercules Powder Company of Wilmington, Delaware; polyalphamethyl styrene, Velsicol EL-11, a terpolymer of styrene, indene and isoprene marketed by the Velsicol Chemical Company of Chicago, Illinois; Piccolyte S-70 and S-100 (polyterpene resins made from beta pinene available from the Pennsylvania Industrial Chemical Company, and having ring and ball melting points of 70° C. and 100° C., respectively); Piccopale 70 SF and Piccopale 85 (nonreactive olefin-diene resins available from the Pennsylvania Industrial Company, having melting points of 70° C. and 85° C. and molecular weights of 800 and 1,000, respectively); Piccodiene 2212 (a styrene-butadiene resin available from the same company); Piccolastic A-75, D-100 and E-100 (polystyrene resins with melting points of 75° C., 100° C., respectively, available from the same company); cumarone-indene resins available under the trade names Neville R-21 and Nevillac Hard; Amberol ST137X (an unreactive unmodified phenolformaldehyde resin available from the Rohm and Haas Chemical Company of Philadelphia, Pa.; Aroclor 1242 (a chlorinated polyphenyl resin); Pliolite AC (a styrene-acrylate copolymer); Pliolite VTAC (a vinyl toluene-acrylate copolymer); Neolyn 23 (an alkyd resin available from the Hercules Powder Company) and mixtures of silicone and styrene resins. Where the deformable thermoplastic itself is to be photoconductive, this may be accomplished by taking any suitable photoconductive material and dispersing it, mixing it in solid solution or copolymerising it with the deformable resin material. In another approach the polymer may be blended with a complexing agent so as to form a photoconductive complex; thus, for example, phenolformaldehyde polymer may be made photoconductive by complexing it with 2,4,7-trinitrofluorenone or any other suitable Lewis acid. Typical photoconductive materials include inorganics such as selenium, cadmium selenide, cadmium sulfide, zinc sulfide, zinc selenide, zinc oxide, lead oxide, lead sulfide, mercuric sulfide, antimony sulfide, mercuric oxide, indium trisulfide, titanium dioxide, arsenic sulfide, gallium triselenide, zinc cadmium sulfide, lead iodide, lead selenide, lead telluride, gallium telluride, mercuric selenide and the iodide, sulfide, selenide and tellurides of bismuth, aluminum and molybdenum as well as organic photoconductors especially when these are complexed with small amounts of suitable Lewis acids. Typical of these organic photoconductors are 1,4-dicyanonaphthalene; anthracene, 3-benzilidene-aminocarbazole; 2,5-bis-(p-aminophenyl-1)-1,3,4-oxidiazole; vinyl carbazole; 2,4-diphenyl-quinazoline; 1-methyl-2-(3',4'-dihydroxy - methylene - phenol)-benzimidazole and substituted and unsubstituted phthalocyanines and quinacridones.

This imaging web passes between a grounded backing electrode 13 and a shielded corona generating electrode 14, connected to a source of high potential 16, adapted to uniformly charge imaging web 11 by corona discharge. This type of corona charging technique is more fully described in U.S. Patent 2,588,699 to Carlson and 2,836,725 to Vyverberg, however, it is to be understood that any other suitable charging method may be used. Once the web has been uniformly charged, it passes beneath an actinic light source projector 17 which serves to expose it through an optical screen 18 and a lens 20. Although any suitable optical screen may be employed, the opaque areas on the screen preferably have a repetition frequency such that their projection forms alternating charged and uncharged areas in the hydrodynamic resonant frequency range of the film. That is to say, the wavelength of occurrence of the charged areas should preferably be from about 1.5 to about 2.7 times the thickness of the film for films greater than 2 microns thick and from about 1.5 to about 5 times for thinner films. Other frequencies outside this range may also be employed but these will generally yield much less intense images. This pattern of charge is of course formed when light or other actinic electromagnetic radiation passing through the transparent areas of the screen 18 fall on the photoconductive imaging web 11 rendering them conductive so that charge in these exposed areas is dissipated. Imaging web 11 then passes under a second projector 19 similar to projector 17, which is employed to project an image of the original 21 through lens 22 onto the imaging surface so that image exposure is superimposed upon the screen exposure provided by elements 17 and 18. This second exposure modulates the original pattern of charge left behind after the screen exposure, dissipating charge in exposed areas while unexposed areas corresponding to the darker areas of the original 21 remain charged according to the screen pattern. Screen exposure and image exposure may take place simultaneously by superimposing the image and screen pattern in one projector. In fact this exposure technique is preferred since it produces a greater degree of carrier modulation than sequential exposures. These exposures may also be made during charging by using out-of-focus charging wires in the optical path. Once the final charge pattern is produced on the photoconductive thermoplastic imaging web 11, it passes beneath an electrical resistance radiant heater 23, so as to soften the thermoplastic to the point where the charge pattern causes it to deform. The web then passes over roller 24 forming a cooling loop 26 which gives the thermoplastic time to harden before it is rolled up on a takeup reel 27.

In projecting an image made according to this invention, such as one produced by the exemplary apparatus described in FIGURE 1, a coherent light source is employed. Although any suitable coherent source may be used, a laser 28 connected to a power source 29 has been illustrated in FIGURE 2. The laser is placed at an off-axis angle $\theta$ from which it illuminates one image 31 on the web 11 as it is held in a planar position under tension over rollers 32. A condenser lens 33 just behind film 11, an opaque apertured mask 34 and a projection lens 35 between web 11 and screen 36 demodulate the image signal from its carrier by spatial filtering and project it so that a reproduction of the original image 21 is formed on screen 36. The collimated beam from the laser forms a Fraunhoffer diffraction pattern of the deformation pattern 31 in the back focal plane of condenser lens 33.

Light source 28 is placed at an angle $\theta$ with respect to the optical axis so that the zero, $-1$ and $+2$ order diffraction spectra are obscured by mask 34 at points 38, 39 and 41, respectively, while the first order passes through the aperture in mask 34 and projection lens 35 to form the demodulated image on screen 36. Lens 35 projects the image on the screen. The zero order is obscured and is not used for imaging since it has a large D.C. component produced by undeviated light which would produce a lower contrast in the projection than in the original object. The unused higher diffracted orders are also obscured when they strike mask 34 at various angles off the optical axis to prevent them from interfering with the order used for forming the image. Although this separation of first order from the zero order and other orders higher than one provides a demodulated image when used in this system, it is to be understood that orders higher than the fifth may be used and are even preferred to reduce distortion with higher deformation images. The angle $\theta$ at which the light source is set so that the mask aperture is centered on the desired order diffraction maxima is determined by the characteristics of the deformation image itself and the wavelength of the light source. This angle can be determined by the formula $$\Phi = \text{Sin}^{-1}\left[\frac{n\lambda}{d} - \sin\theta\right]$$

where $\theta$ is the off-axis angle of the light source, $\lambda$ is the light wavelength, $d$ is the image groove spacing, $n$ is an integer representing the desired diffraction order and $\Phi$ is off-axis angle of the center of the aperture. By setting $\Phi$ equal to zero and solving for $\theta$ the aperture can be set on the optical axis. Since the diffraction spectra of adjacent orders overlap, the aperture should only be about half as wide as the spectra of the desired order, to prevent interference effects which might occur if portions of the undesired orders passed through the aperture. An aperture of this width B is given by the formula $$B = 2F \tan\left[\sin^{-1}\frac{\lambda}{2d}\right]$$

where F is the spacing between the first lens and the aperture.

It is to be understood that the spatial filtering technique described above is exemplary only and that any suitable technique known in the art may be employed. Reference is made, for example, to an article by Suzuki et al. appearing in the "Journal of Applied Optics," vol. VII, p. 825, published 1964, for a description of various spatial filtering techniques. One alternative to the technique described in connection with FIGURE 2 involves the use of a small reflecting surface in the optical path in place of the obscuring mask 34 with this small reflecting surface being placed at the point where the mask aperture is shown in FIGURE 2. In this alternative approach the screen or photosensitive imaging surface is placed in the system so as to receive the reflected light only, thereby demodulating the signal and separating it from light produced by the carrier and unwanted side bands which pass by the small reflecting surface.

The use of the imaging technique of this invention has been found to yield an important gain in the signal to noise ratio of the imaging system which in turn results in a large increase in the usable sensitivity of the process. It is, of course, to be understood that the imaging technique in which the image signal is superimposed on the carrier may be carried out by any one of a number of alternative techniques, which will be obvious to those skilled in the art, including not only the electron beam technique described in the introduction and the charging and exposure technique described in connection with FIGURE 1 but also other techniques in which either or both of the signal and the carrier are deposited on the insulating web via electrical discharge recording as described, for example, in U.S. Patents 2,919,967 and 2,978,968 to Schwertz or in which the charge pattern is formed on an entirely distinct photoconductive insulating layer and transferred to the deformable thermoplastic layer by techniques such as those described in U.S. Patent 2,937,943 to Walkup. Various other modifications involving laying down the charge pattern, softening the deformable thermoplastic as by using a solvent vapor or a deformable resin which is initially soft at room temperature, techniques for fixing the image, the use of various coherent sources and modifications in spatial filtering will become apparent to those skilled in the art upon a reading of this disclosure, and these are intended to be encompassed within the scope of the invention.

What I claim is:

1. A method of image storage and reproduction comprising forming a thermoplastic deformation pattern on an imaging member, said pattern being composed of a periodic carrier at the resonant frequency for said member, said carrier being amplitude modulated with an image signal to be reproduced, projecting said pattern with a coherent light source and demodulating the image signal from the carrier in the projected beam by spatial filtering.

2. A method according to claim 1 including forming said deformation pattern with a periodic carrier wavelength from about 1.5 to about 2.7 times the deformable film thickness, on a film thicker than about two microns.

3. A method according to claim 1 including forming said deformation pattern with a periodic carrier wavelength of from about 1.5 to about 10 times the deformable film thickness on a film thinner than about two microns.

4. A method according to claim 1 including spatially filtering the carrier from the projected image beam by obscuring the discrete points in the diffraction pattern formed by the carrier.

5. A method according to claim 1 including demodulating the image signal from the carrier in the projected beam by placing a reflecting surface in the optical path of the projected beam with transmitting portions corresponding to the discrete points in the beam produced by diffractions from the carrier so that the spatial frequency spectrum of the carrier is passed through the reflecting surface while the remainder of the image is reflected off at an angle from the original path.

6. A method of image storage and reproduction comprising forming a periodic pattern of electrostatic charge on a deformable insulating thermoplastic imaging member at the resonant frequency thereof said periodic charge pattern being amplitude modulated in accordance with the optical properties of an image to be reproduced, softening said deformable thermoplastic until a deformation pattern appears thereon corresponding to said pattern of charge, projecting said deformation pattern on said imaging member with a coherent light source and demodulating the image signal from said carrier in the projected beam by spatial filtering.

7. A method of image storage and reproduction comprising forming a charge pattern corresponding to an image to be reproduced on a photoconductive insulating thermoplastically deformable imaging member by electrostatically charging and exposing said member to a pattern of actinic electromagnetic radiation corresponding to said image pattern, exposing said imaging member to a periodic carrier pattern and softening said imaging member until a thermoplastic deformation pattern appears on said imaging member corresponding to said carrier pattern, amplitude modulated by image exposure, projecting said pattern with a coherent light source and demodulating the image signal from said carrier in the projected beam by spatial filtering.

8. A method according to claim 6 including carrying out said imaging steps in their named order.

9. A method of image storage and reproduction comprising forming a thermoplastic deformation pattern on an imaging member, said pattern being composed of a periodic carrier at the resonant frequency for said member, said carrier being amplitude modulated with an image signal to be reproduced, projecting said pattern with a coherent light source to form a diffraction pattern and demodulating the image signal from the carrier in the projected beam by projecting only one order diffraction spectrum higher than the zero order on a receiving surface.

References Cited

UNITED STATES PATENTS

| 3,175,196 | 6/1966 | Lee et al. | 340—173 |
| 3,214,272 | 10/1965 | Ploke | 96—1 |
| 3,262,122 | 7/1966 | Fleisher et al. | 346—1 |

OTHER REFERENCES

Proceedings of the National Electronics Conference, vol. 15, 1959, pages 262–275, "Filtering Operations Using Coherent Optics."

IRE Transactions on Information Theory, June 1960, pages 386–400, "Optical Data Processing and Filtering Systems."

J. TRAVIS BROWN, *Primary Examiner.*

J. C. COOPER III, *Assistant Examiner.*

U.S. Cl. X.R.

350—162; 340—173; 346—77; 88—105